United States Patent [19]

Hansel

[11] 3,953,929

[45] May 4, 1976

[54] TEACHING MACHINES
[76] Inventor: Charles Edward Mark Hansel, 44 Eaton Crescent, Swansea, Glamorgan SA1 4QL, Wales
[22] Filed: Mar. 27, 1975
[21] Appl. No.: 562,549

Related U.S. Application Data
[63] Continuation of Ser. No. 289,932, Sept. 18, 1972, abandoned.

[30] Foreign Application Priority Data
Sept. 17, 1971 United Kingdom............... 43506/71

[52] U.S. Cl.................................... 35/48 R; 35/9 A
[51] Int. Cl.².......................................... G09B 7/02
[58] Field of Search................. 35/6, 8 R, 8 A, 9 R, 35/9 A, 9 B, 35 C, 48 R

[56] References Cited
UNITED STATES PATENTS

| | | | |
|---|---|---|---|
| 3,355,819 | 12/1967 | Hannah et al. | 35/9 A |
| 3,538,626 | 11/1970 | Frank | 35/48 R |
| 3,546,791 | 12/1970 | Koos et al. | 35/9 B |
| 3,577,657 | 5/1971 | Plumly et al. | 35/9 A |
| 3,647,926 | 3/1972 | Rohloff et al. | 35/48 R |
| 3,693,268 | 9/1972 | Thompson | 35/48 R |

Primary Examiner—Richard C. Pinkham
Assistant Examiner—Vance Y. Hum
Attorney, Agent, or Firm—Dressler, Goldsmith, Clement & Gordon, Ltd.

[57] ABSTRACT

This is a teaching machine in which in a teaching mode, a question and its answer are displayed and the pupil sets the answer for that question into a number of settable memory units. In the examining mode, when the same question is displayed, the pupil sets in what he thinks is the correct answer, and that is compared with the answer in the memory units.

The apparatus can be reset for different questions.

10 Claims, 4 Drawing Figures

TEACHING MACHINES

This is a continuation, of application Ser. No. 289,932, filed Sept. 18, 1972, now abandoned.

This invention relates to a teaching machine and one object of the invention is to provide a teaching machine which enables different programmes to be set up easily without having to remake internal connections whether by peg-board type of connections or by soldering.

According to the present invention a teaching machine has terminals for setting in questions to be answered and selectors for selecting the answer to a set question from among a number of possible answers, and the machine includes for each terminal a settable memory which can be set by use of the appropriate selector with a correct answer in a setting or teaching mode of operation so that that answer will be retained for use during a subsequent examining mode of operation.

Each memory conveniently consists of a number of memory units, one for each selector, each unit including a bistable latch; each such memory unit may consist of a combination of logic elements and when the machine is set for the setting mode of operation the correct answers for a particular programme can be set in by the teacher before the machine is switched to the examining mode ready for the student. Alternatively the student may set the correct answers in the teaching mode of operation which can act to teach him and for this purpose it can be arranged that whenever during the teaching mode a particular question is posed the answer can be displayed or the student to learn and for him also to set the memory unit.

Thus in the examining mode when the question is posed, whether in the same order as in the teaching mode or not, the student can operate one of the selectors and the machine can determine by reference to the memory unit whether the correct selector has been operated.

Preferably each terminal is associated with one memory unit for each possible answer and then the appropriate memory unit will be set corresponding to the selector which is operated during the setting mode.

The machine may be arranged to give a 'correct' signal if in the examining mode the right selector is operated in answer to a particular question. Then if in the examining mode when a question has been set a selector is operated and the 'correct' signal is not produced, an error signal can be displayed.

The machine may be capable of use with multicharacter answers, with a memory for each character of each answer.

It is possible with a machine according to the invention that during the setting or teaching mode an incorrect answer may be set in the memory unit and then if the student gives the correct answer to that question in the examining mode an error will be indicated.

According to a feature of the invention when an error is indicated, the examining mode may be arranged to clear the memory unit for that particular question so that it can be reset by copying in the correct answer which is displayed following an error. An incorrectly set memory unit can be corrected without the error being perpetuated.

The following is a brief description of some features of a machine embodying the invention.

A programme is placed on the machine by writing questions and answers in appropriate positions on a sheet. This programme after being placed on the machine is covered with a screen so that the questions and answers are not visible. A light behind a question - or answer — makes it visible to the pupil. The questions are lit in sequence and the sequence changes according to the progress of the pupil. If he makes a mistake, the answer lights up, and following insertion of the right answer the machine changes its sequence so as to give training on the item incorrectly answered. The pupil gives his answer by pressing appropriate buttons B. When he has pressed the correct buttons the machine procedes to the next question. At the end of batches of questions the machine indicates to the pupil how well he has done, and then switches to a different sequence of questions if the pupil's progress in the previous sequence requires it; for example if he is error free, or if he has been rapid enough.

In the past when a sheet of questions was placed on the machine, it was necessary to arrange that the machine responded only to the correct buttons in relation to each question. This was done by means of prewired panels pushed into multiway sockets, by means of a switch box consisting of a number of adjustable rotary switches or by other means. The present system is to replace these methods of programming.

The machine may also be used with auditory presentation of questions and answers or with the two modes combined. Questions and answers are recorded on a multi track loop of tape which is switched from one recording channel to another in the same sequences as are the lights that show up the questions and answers.

The particular method of storage shown is only one possible method. Any method of storage, i.e., magnetic core, condenser etc. could be employed instead.

The invention may be carried into practice in various ways and one embodiment will be described by way of example with reference to the accompanying drawings, in which.

Figure 1:
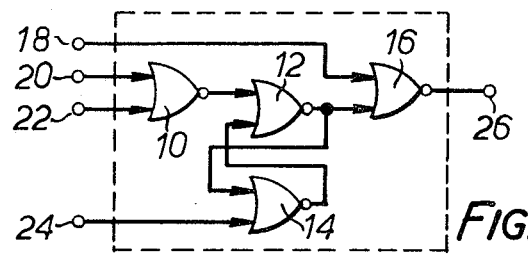
FIG. 1 is a diagram of a memory unit.

The memory unit shown in FIG. 1 comprises four NOR gates 10, 12, 14 and 16, and has five terminals: a 'read' terminal 18, a 'write' terminal 20, an input terminal 22, a clear' terminal 24, and an output terminal 26.

The gates 12 and 14 form a bistable latch, one input of each gate being connected to the output of the other. The remaining input of gate 14 is connected to the 'clear' terminal 24, so that a logical '1' on the 'clear' terminal will set the output of gate 14 to '0' and one input of gate 12 also to '0'. The remaining input of gate 12 is connected to the output of gate 10, the inputs of which are connected to the input terminal 22 and the 'write' terminal 20 respectively. Therefore, as long as a logical '1' is applied to the 'write' terminal 20, the output of gate 10 is a logical '0' and cannot affect the state of the bistable latch. If a logical '0' is now applied to the 'write' terminal 20, the output of gate 10 will be the inverse of the signal on the input terminal 22. If this signal is a logical '1', the bistable latch will not be affected; however, if it is a logical '0', the bistable latch will be set so that the output of gate 12 is a logical '0'.

The output of gate 12 is also connected to one input of gate 16, the other input of which is connected to the 'read' terminal 18, and the output of which is connected to the output terminal 26. As long as a logical '1' is applied to the 'read' terminal 18, the output terminal 26 will be at a logical '0'. If a logical '0' is now applied to the 'read' terminal 18, the output terminal 26 assumes the opposite state to the output of gate 12.

Thus, to store information in the memory unit, a logical '1' is applied to the 'clear' terminal 24. A logical '0' is then applied to the 'write' terminal 20, so that the output of gate 12 assumes the same state as the input terminal 22.

To read from the memory unit, a logical '0' is applied to the 'read' terminal 18; this causes the output terminal 26, which previously carried a logical '0', to assume the opposite state to the output of gate 12.

Figure 2:
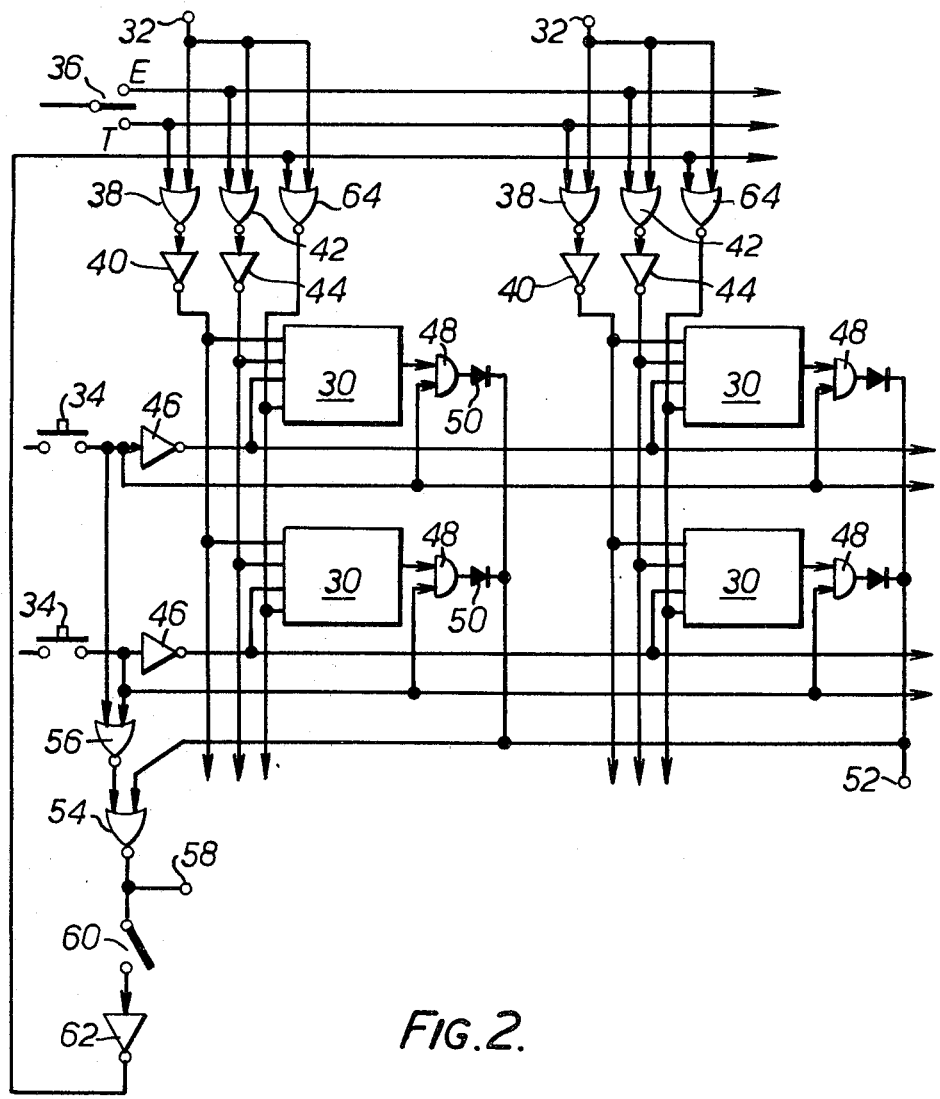
FIGS. 2 and 3 are diagrams of two teaching machines embodying the invention and using memory units as shown in FIG. 1.

The teaching machine shown in FIG. 2 includes a number of memory units 30 of the type shown in FIG. 1; only four are shown, but it should be understood that the machine may include as many memory units as required. The machine also includes a question identifying means constituted by an input terminal 32 for each question; only two are shown. To set a particular question, a logical '0' is applied to the corresponding input terminal by means which are not shown, but can be conventional.

Similarly, the machine includes a number of push buttons 34; the number of push buttons is as large as is necessary to type out answers, but for the sake of simplicity only two buttons are shown. The pupil can select an element of an answer by operating one of the push buttons 34.

A switch 36 is arranged so that when it is set to its 'teach' position T, it applies a logical '1' to one input of each of a number of NOR gates 38, one for each input terminal 32. The other input of each NOR gate 38 is connected to the corresponding input terminal 32, and the output of each NOR gate 38 is connected through an inverter 40 to the 'read' terminal 18 of all the memory units associated with the particular input terminal 32. Thus, as long as the switch 36 is set to its 'teach' position T, the 'read' terminals 18 of all the memory units 30 carry a logical '1', and the output terminals 26 of all the memory units 30 are held at a logical '0'.

Similarly, when the switch is set to its 'examine' position E, it applies a logical '1' to one input of each of a number of NOR gates 42, one for each input terminal 32. The other input of each NOR gate 42 is connected to the corresponding input terminal 32, and the output of each NOR gate 42 is connected through an inverter 44 to the 'write' terminal 20 of all the memory units associated with the particular input terminal 32. Thus, as long as the switch 36 is set to its 'examine' position E, the 'write' terminals 20 of all the memory units 30 carry a logical '1', and the state of the memory cannot be affected.

In operation, the machine is first programmed with the answers to the questions. To do this, the switch 36 is set to its 'teach' position, so that all the output terminals 26 of the memory units 30 are held at logical '0'. The first question is then asked by applying a logical '0' to the corresponding input terminal 32, which causes the question to be displayed on a screen. Since both inputs of the corresponding NOR gate 42 are at a logical '0', a logical '0' will be applied to all the write inputs of the memory units 30 corresponding to the first question. Operation of the appropriate push button 34, according to which answer is correct, will apply a logical '1' to the input of an inverter 46; one inverter 46 is provided for each push button 34. The output of inverter 46 is connected to the input terminals 22 of all the memory units 30 corresponding to that inverter, so that a logical '0' is applied to the input terminals 22 of all the memory units 30 corresponding to the selected push button 34. This only affects the memory unit 30 which corresponds both to the question being asked and the push button 34 operated, since all other memory units 30 will have a logical '1' applied to either their 'write' terminal 20 or their input terminal 22. Thus, the answer to the first question is recorded in the memory by the memory unit 30 corresponding to the selected push button 34. The machine also advances to the next question, by means not shown, when the answer to the first question has been recorded.

When all the answers have been recorded, the switch 36 is set to its 'examine' position, so that a logical '1' is applied to the 'write' terminals 20 of all the memory units 30. The first question is then asked by applying a logical '0' to the corresponding input terminal 32; this causes a logical '0' to be applied to all the 'read' terminals 18 of the memory units 32 associated with the first question, since the corresponding NOR gate 38 will have a logical '0' on both its inputs.

The pupil then answers the question by operating one of the push-buttons 34. This causes a logical '1' to be applied to one input of each of a number of AND gates 48, one of which corresponds to each of the memory units 30 associated with the selected push button 34. The other input of each AND gate 48 is connected to the output terminal 26 of the associated memory unit 30. The output of each AND gate 48 is connected through a diode 50 to a terminal 52; the diodes 50 are arranged to act as an OR gate. Thus, if the correct push button 34 is operated, both inputs of the corresponding AND gate 48 will carry a logical '1', and terminal 52 will carry a logical '1', signifying that the question has been correctly answered; the terminal 52 will otherwise carry a logical '0'.

The terminal 52 is connected to means (not shown) for advancing the machine to the next question when a correct answer has been inserted. It is also connected to one input of a NOR gate 54, whose other input is connected to the output of a NOR gate 56: each push button 34 is connected to one input of NOR gate 56. Thus, the output of NOR gate 56 will carry a logical '0' only when a push button 34 is operated. If an incorrect push button 34 is operated, a logical '0' will be applied to both inputs of NOR gate 54, and its output will carry a logical '1', indicating an error. This signal is supplied to a terminal 58, which is connected to means (not shown) for causing the question to be repeated if an error is made. The correct answer (or a prompt) will also be displayed on a screen.

It is possible that an error may be made in programming the machine. If this is so, an error will be indicated in the examining mode, even when the correct answer, as displayed on the screen, is selected. To allow the programming error to be corrected, a switch 60 is provided, which, when closed, connects terminal 58 to the input of an inverter 62. The output of the inverter 62 is connected to one input of each of a number of NOR gates 64, one for each input terminal 32. The other input of each NOR gate 64 is connected to the associated input terminal 32, and the output of each NOR gate 64 is connected to the 'clear' terminals 24 of all the memory units 30 associated with that particular input terminal 32. Thus, if an error is made and logical '1' appears at 52, the switch 60 can be closed, so that a logical '1' is applied to the 'clear' terminals 24 of these memory units 30. The machine is then set temporarily into the 'teach' mode, so that the correct answer to the particular question can be programmed.

Figure 3:
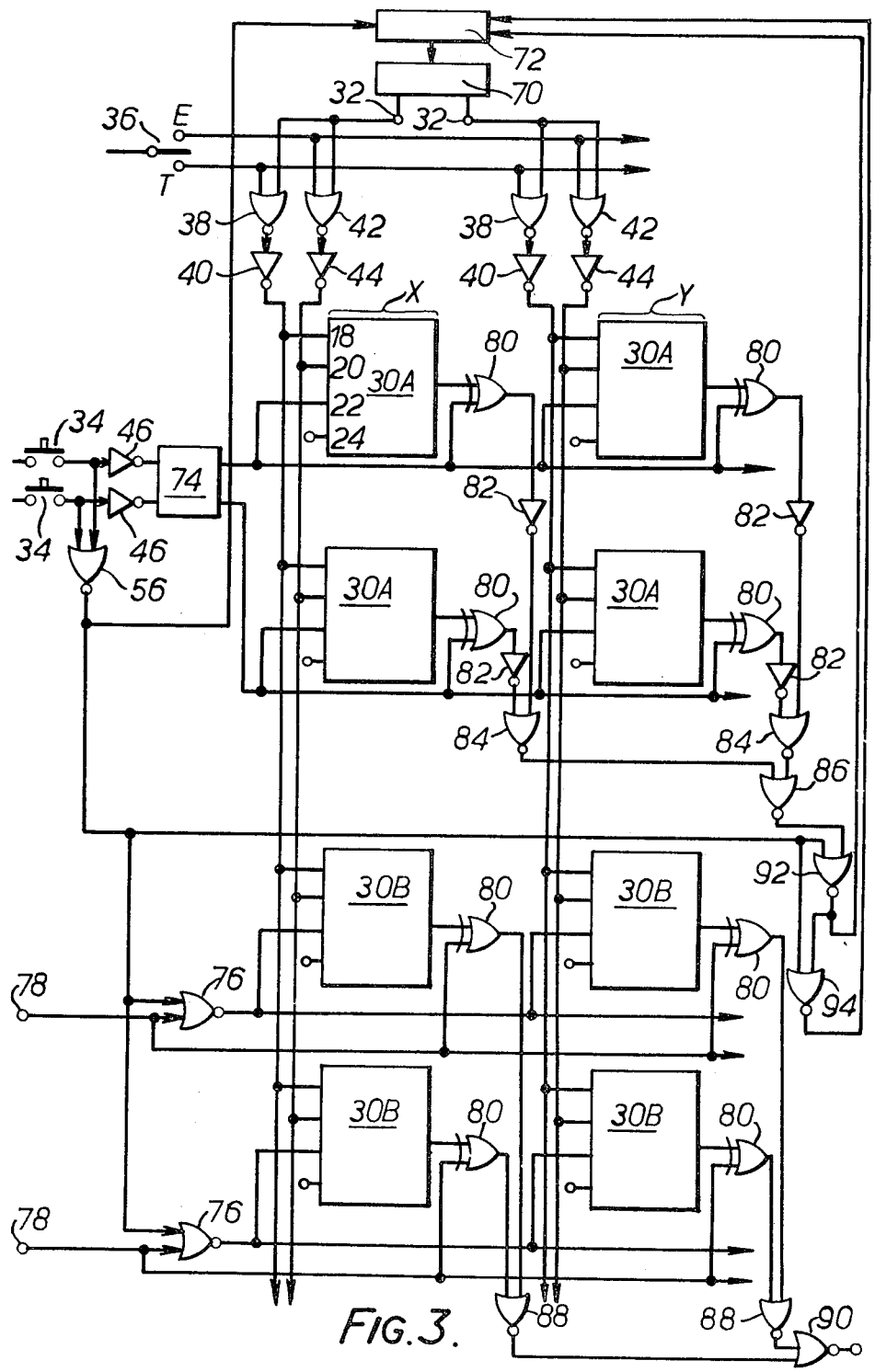

The teaching machine shown in FIG. 3 also includes a number of memory units 30 of the type shown in FIG. 1; only eight memory units are shown. The memory units are grouped in as many locations as there are push button operations required to record and answer a complete series of questions. Thus, if there are $x$ questions and each question has $y$ digits or letters in its answer there would be $xy$ locations. Only two locations $x$ and $y$ are shown.

Each location is divided into two sections: the memory units 30B of one section record the number of the question currently being answered, while the memory unit 30A of the other section record the operation of one of a number of push buttons by which the questions are answered. Each section is shown as having two memory units 30B for recording question numbers and also two units for setting up answers for two buttons 34, but in practice more units and buttons may be required.

The machine also includes a teach/educate switch 36, NOR gates 38 and 42, inverters 40 and 44, and input terminals 32, which operate in a similar way to the components indicated by these numbers in FIG. 2. However, the input terminals 32 are driven through a decoder 70, from the outputs of a memory control counter 72. Thus, a logical '0' is applied to the NOR gates 38 and 42 associated with the particular location $x$ or $y$ corresponding to the contents of memory control counter 72 identifying a particular question or digit of a question.

Push buttons 34 and inverters 46 are also provided as in FIG. 2, but instead of the latter being connected directly to the input terminals of the memory units 30, they are connected to the input terminals of an encoder 74, where respective output terminals are connected to the input terminals 22 of the respective memory units 30A in all the locations in the store.

The push buttons 34 are also each connected to one input of NOR gate 56. The output of NOR gate 56 is connected to one input of each of a number of NOR gates 76, one for each memory unit 30B in that section of a location. The other inputs of the NOR gates 76 are connected to input terminals 78. An encoded signal is applied to the input terminals 78 to identify the number of a particular question. The outputs of NOR gates 76 are connected to the inputs of the corresponding memory units in the section B of the memory. There is a single NOR gate 76 for a number of units 30B, one in each location.

When the switch 36 is set to its 'teach' position so that the machine can be programmed the memory control counter 72 is set to 1 identifying question No. 1. A logical '0' is therefore applied to all the 'write' terminals 20 of the memory units 30A of the first location X of the memory. The first question and its answer are then displayed on a screen as with the machine shown in FIG. 1. Operation of one of the push buttons 34 corresponding to the first digit of the answer will cause that digit to be recorded in the section A of that location, while the output of NOR gate 56 will change to a logical '0', so that the encoded signal at the terminals 78 representing the question being asked is recorded in the section 30B of the location X. The output of NOR gate 56 is also connected to the memory control counter 72, so that every time a push button 34 is operated the memory control counter 72 will be advanced by 1 and the next location will be prepared for setting.

Thus, successive operations of the push buttons 34 will be recorded in the section 30A of successive locations X, Y ... of the memory, while the encoded signal representing the first question is recorded in the section 30B of all those locations.

When the answer to the first question has been completely recorded, a push button (not shown) is operated to advance the machine to the next question. The encoded signal representing the next question will then appear at input terminals 78, and will be recorded in the section 30B of the locations in whose first sections the answer to the next question is recorded. All the answers to the questions are recorded in this way.

The machine can then be switched into its examine' mode by means of switch 36. This resets the memory control counter 72 to 1. Pulses are applied to the counter in turn so that the count is advanced progressively upwards from 1. A logical '0' is applied from the inverter 40 to the 'read' terminals 18 of the memory units 30 of the location corresponding to the state of the memory control counter 72 at any instant.

The output terminal 26 of each of the memory units 30 is connected to one input of an exclusive — OR gate 80. The other input of each exclusive — OR gate 80 is, in the case of each memory unit 30A connected to the same point as the input terminal 22, that is, to the corresponding output of the encoder 74; while in the case of a memory unit 30B; the other input is connected to the corresponding input terminal 78. The outputs of the exclusive — OR gates 80 corresponding to memory units of the first sections are applied, through inverters 82, to the inputs of NOR gates 84, of which there is one for each location. Each NOR gate 84 will only give a logical '1' output when every inverter 46 gives an output which is the inverse of the output of the corresponding memory unit in the location corresponding to that particular NOR gate 84. The output of each NOR gate 84 is connected to one input of a NOR gate 86. Thus, provided the outputs of the memory units of one location are the inverse of the outputs of the corresponding inverters 46, the output of NOR gate 86 will be a logical '0'. Since there will, at any time, only be one location whose memory units give outputs other than logical '0' (the location which is being addressed), the output of NOR gate 86 will indicate whether the same push button 34 has been operated as was operated at the same stage during programming of the machine.

Similarly, the outputs of the exclusive — OR gates 80 corresponding to memory units of the second section are applied, in this case directly, to the inputs of NOR gates 88, of which there is one for each location. Each NOR gate 88 will only give a logical '1' output when the signal applied to each input terminal 78 is the same as the output of the corresponding memory unit in the location corresponding to that particular NOR gate. The output of each NOR gate 88 is connected to one input of a NOR gate 90. Thus, provided the outputs of the memory units of one location are the same as the signals applied to the corresponding input terminals 78, the output of NOR gate 90 will be a logical '0'. Since only the location being addressed will produce any outputs but logical '0', the output of NOR gate 90 will indicate whether the question being asked (in the 'examine' mode) is the same as the question whose answer is recorded in the first section of that location.

The output of NOR gate 90 is applied to a control circuit (not shown) which interrupts the train of pulses being applied to the memory control counter 72 as soon as it is indicated that the question whose answer is stored in the location being addressed is the question being asked. In this way, the correct location of the memory is found and addressed.

If one of the push buttons 34 is now operated, the NOR gate 56 will give a logical '0' output. If the push button operated is the correct one, the NOR gate 86 will also give a logical '0' output. The outputs of NOR gates 56 and 86 are connected to the inputs of a further NOR gate 92, whose output is connected to the memory control counter 72 so that when a digit of an answer has been correctly entered by means of one of the push buttons 34, the counter 72 is advanced by 1 to prepare the next location for the next digit of the answer to be entered.

The outputs of NOR gates 56 and 92 are also connected to the inputs of a further NOR gate 94, which will therefore produce a logical '1' output if the wrong push button 34 is operated. The output of NOR gate 94 is connected to the memory control counter 72 so that if this occurs, the counter is reset to 1, and then advanced by a train of pulses as before, so that the answer to the question must be started again. The output of NOR gate 94 is also connected to an error routine circuit (not shown), to cause repetition of the question.

When the complete answer to the question has been correctly entered, the next location will be prepared by the counter 72 and so the units 30B in the location being addressed will disagree with the encoded signal applied to the input terminals 78, and the NOR gate 90 will produce a logical '1' output. When this occurs, the encoded signal will be changed to that representing the next question; the memory control counter 72 is then reset to 1, and advanced by a train of pulses, as before, until the location containing the first digit of the answer to the new question is found and addressed.

Although not shown in the drawing, it is also possible to provide an arrangement similar to that shown in FIG. 2, whereby, if the answer to a question has been inserted wrongly during programming, the memory units corresponding to that question may be cleared, allowing the answer to be re-entered correctly. This arrangement would be connected to the output of NOR gate 94.

Figure 4:
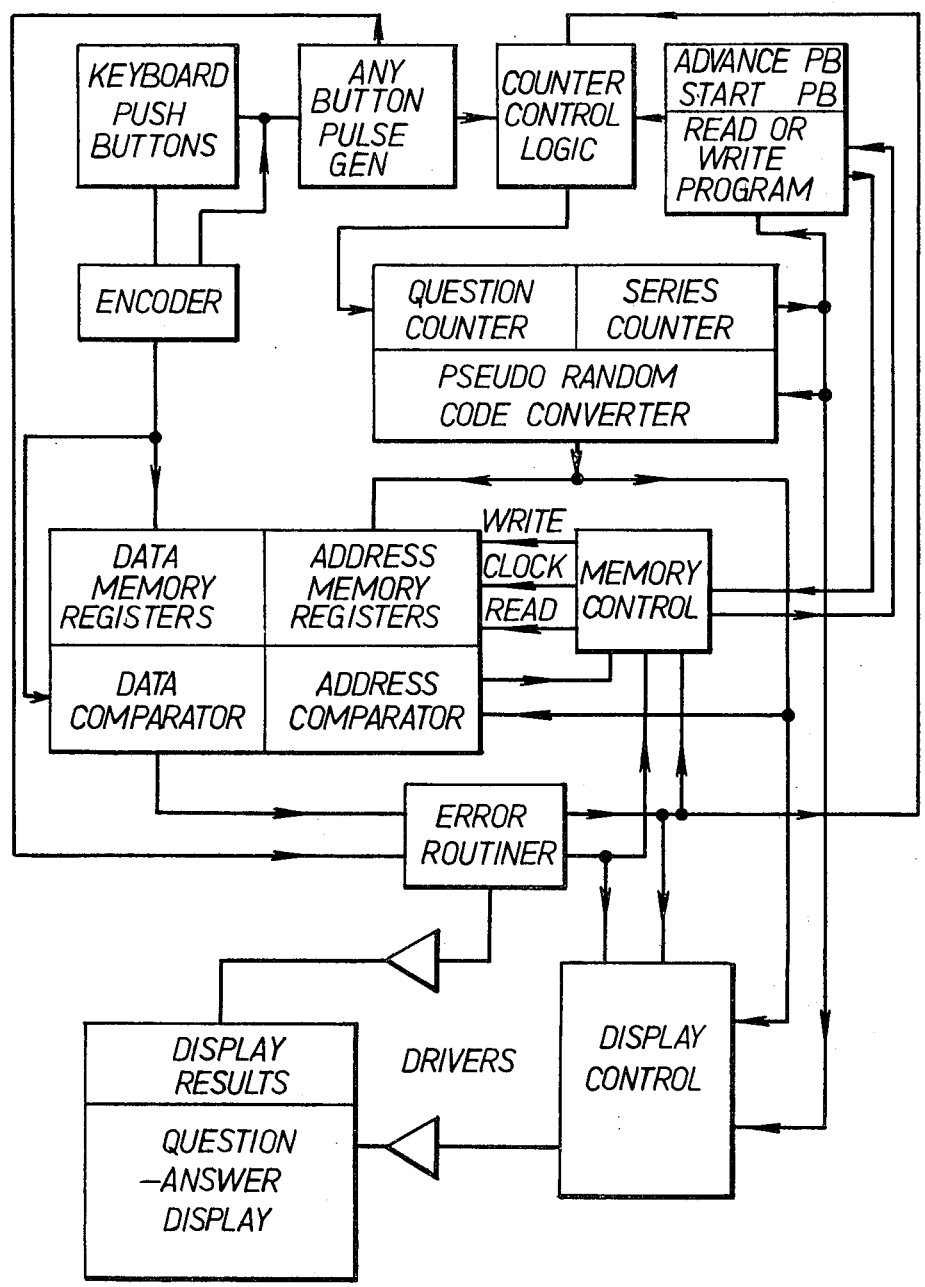
FIG. 4 shows diagrammatically the complete machine corresponding to FIG. 3.

The components indicated as not shown in FIG. 3 are indicated in the block diagram of FIG. 4, operation of which will be self-explanatory.

In a modification, the memory units 30 are replaced by static shift registers. One particular machine has nine registers each having 132 stages. Four registers are used for identifying the numbers of up to 16 questions, and five registers are used for memorising the five code digits of each element of an answer.

A keyboard with 30 push-buttons can be coded to identify any button with a five digit binary code.

In the teaching mode a question number is set up and then the final elements of the answer is entered. A clock pulse advances all the shift registers by one step, the question number is repeated, and the second element of the answer entered, and so on until when the answer is complete, the second question number is entered.

132 elements of answer can be stored in the memory.

In the examination mode, a question number is repeated, and the pupil enters an answer. The register receive clock pulses and re-cycle until the question number appears, and the memorised elements of the answer are compared in turn with the elements entered by the pupil.

In other respects operation is similar to FIG. 3. The equipment is cheaper and is simpler except in so as a clock pulse generator needed.

What I claim as my invention and desire to secure by letters patent is:

1. A single-station question and answer teaching machine having teaching and examining modes of operation comprising: means for alternatively selecting teaching and examining operating modes; a plurality of settable memory means; a plurality of terminal means, each of said terminal means being connected to a different group of said plurality of memory means for setting in a different question identifier for each question to be answered; a plurality of selector means for selectively providing a correct answer and a response to a plurality of possible answers at said single station, each of said plurality of selector means being connected in common to a corresponding memory means, the corresponding memory means in each of said groups being set in response to the activation of an appropriate one of said selector means and said terminal means corresponding to said group for storing a correct answer and question identifier to a question when said alternatively selective means is operated to select the teaching operating mode and for retaining the correct answer for use during a subsequent examining mode; and comparing means connected to said corresponding memory means having the correct answer and to said selector means for selecting a response to each question from among a number of possible answers when said alternatively selecting means is operated to select the examining operating mode, whereby said comparing means indicates whether the response represented by the operation of said selector means is the same as the answer retained in said memory means.

2. A teaching machine as claimed in claim 1 in which each memory means includes a number of memory units, one for each of said selector means.

3. A teaching machine as claimed in claim 2 in which each of said memory units includes a bistable latch and a combination of logic elements enabling the latch to be set in the teaching mode and compared with an input in the examining mode.

4. A teaching machine as claimed in claim 1 including means for displaying a question which has been set in, and for displaying the answer during the teaching mode.

5. A teaching machine as claimed in claim 2 capable of use with multi-character answers and including separate memory means for each character of each answer, said selector means being used for selecting each character of each answer.

6. A teaching machine as claimed in claim 5 wherein said plurality of settable memory means includes including question identifier memory means for each character of each answer, each question identifier memory means corresponding to one settable memory means, said terminal means capable of setting all the identifier memory means for one answer with the question identifier of the corresponding question during the teaching mode.

7. A teaching machine as claimed in claim 6 including means for providing a 'new question' signal when a question set in during the examining mode is not the question identified by the question-identifier means.

8. A teaching machine as claimed in claim 7 including means for displaying and identifying a succeeding question in response to a 'new question' signal.

9. A teaching machine as claimed in claim 1 including means for indicating an error in the examining mode.

10. A teaching machine as claimed in claim 9 including means responsive to the error-indicating means for clearing the corresponding settable memory means.

* * * * *

UNITED STATES PATENT OFFICE
CERTIFICATE OF CORRECTION

PATENT NO. : 3,953,929
DATED : May 4, 1976
INVENTOR(S) : Charles Edward Mark Hansel It is certified that error appears in the above-identified patent and that said Letters Patent are hereby corrected as shown below:

Column 1, line 34, "or" should be --for--. Column 2, line 51, "clear'" should be --'clear'--. Column 5, line 41 "where" should be --whose--. Column 6, line 20, "examine'" should be --'examine'--. Column 8, line 58, claim reference numeral "2" should read --1--; lines 64 and 65 "including" should be deleted; last line after "the" --question-- should be inserted.

Signed and Sealed this

Twenty-seventh Day of July 1976

[SEAL]

Attest:

RUTH C. MASON
*Attesting Officer*

C. MARSHALL DANN
*Commissioner of Patents and Trademarks*